Sept. 19, 1939.  L. M. TROENDLE  2,173,569
TABLE FOR AUTOMOBILES
Filed Nov. 18, 1937  2 Sheets-Sheet 1

Inventor.
Leo M. Troendle

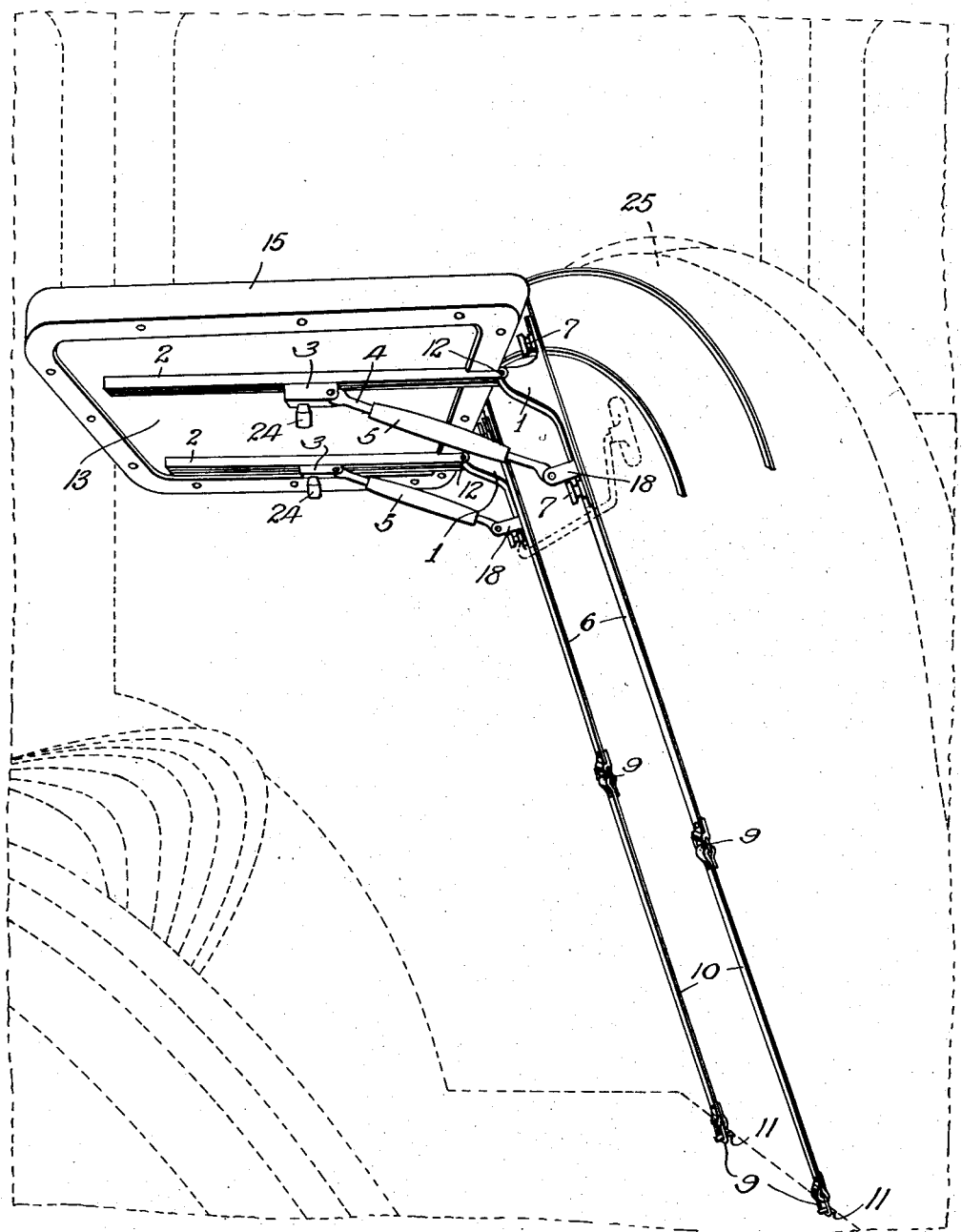

Patented Sept. 19, 1939

2,173,569

UNITED STATES PATENT OFFICE 2,173,569

TABLE FOR AUTOMOBILES

Leo M. Troendle, Brooklyn, N. Y.

Application November 18, 1937, Serial No. 175,217

3 Claims. (Cl. 155—123)

This invention relates to new and useful improvements in tables for automobiles, and aims to provide a novel and simple table construction that may be readily associated with the back of the front seat structure of an automobile. Its general object is to provide a table of the collapsible type to enable the occupants of the motor vehicle to spread a lunch, play cards, use the same as writing desk or the like. An important improvement on this automobile table is its variety of adjustments which make it adaptable to almost any automobile of standard make and of the type commonly known as "sedan", "coach" and "touring car" without changing the construction of the vehicle.

Another improvement on this table is that it can be attached to and removed from the vehicle in but a few seconds. The structural details of this table are such as to make it particularly suitable for automobiles already in use.

One form of the invention is illustrated in the accompanying drawings, in which—

Figure 1:
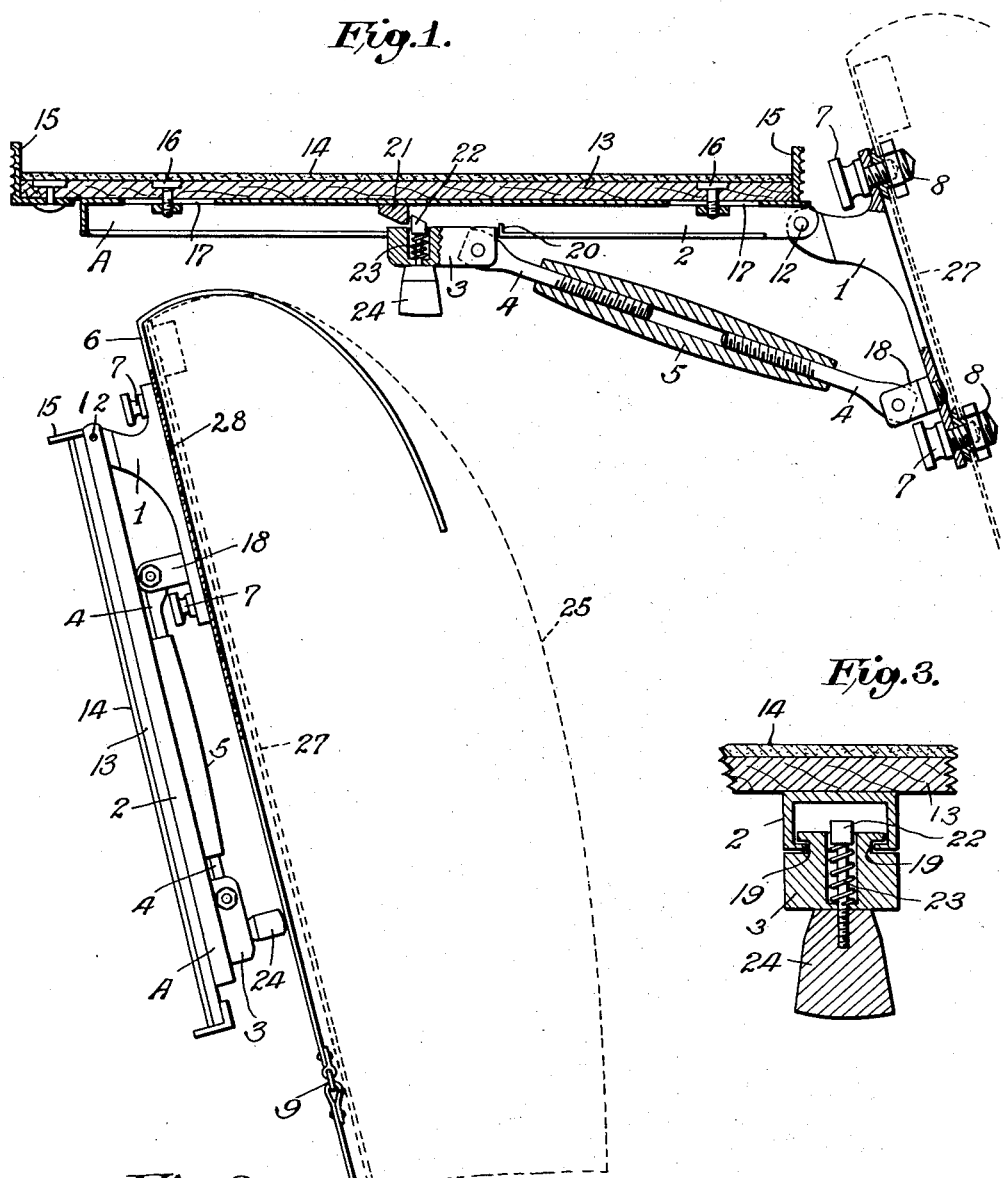

Fig. 1 is a vertical section of the table shelf when in position for use and its supporting and sliding members.

Figure 2:
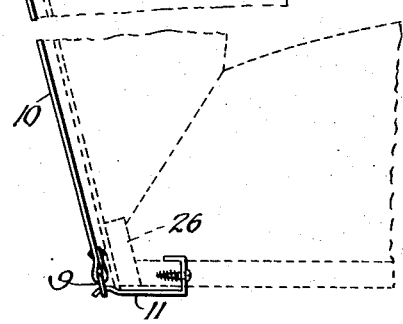

Fig. 2 a cross section of the table in folded position and its means of attachment to the front seat.

Figure 3:
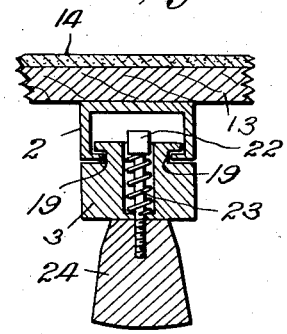

Fig. 3 an enlarged fragmentary section through channel and slide.

Fig. 4 a perspective view of the table put in position for use in an automobile as seen from underneath.

A pair of hinge members 1 provided with two openings in each at their upper and lower ends for the reception of thumb screws 7 is fixed by means of said thumb screws to a pair of metal bars 6 as shown in Fig. 4 and more clearly in Fig. 2. These bars are made of flat steel and curved at the upper ends so as to fit snugly over the top of the front seat 25. The curved ends are sufficiently flexible to cause no discomfort to passengers on the front seat. An outline of the front seat is shown in the drawings in dotted lines. To the lower ends of said metal bars 6 is attached by means of rectangular metal loops 9 a pair of elastic straps 10. These straps in turn are fastened to hooks 11 secured to the lower frame structure of the front seat 26, Fig. 2. Said straps permit extension in length and regulation of tension to conform to varying heights of front seats and their differing constructions.

To avoid interference by the robe rod or rope found in most automobiles of the "sedan" type on the back of the front seat, the metal bars 6 are provided with a plurality of spaced openings 28 which are threaded for the reception of thumb screws 7 so as to secure the hinge members 1 either nearer to the top of the back of the front seat or lower as the position of the robe rod or rope may require. Another reason for this arrangement is to have the table board, when in position for use, situated between one and about 10 inches below the top of the back of the front seat, preferably two inches, to permit passengers on the front seat to use the table with ease.

Instead of fastening the table to said metal bars as shown and described in Fig. 2 and Fig. 4 I may resort to the construction as shown in Fig. 1 wherein it is shown that the hinge members 1 are directly attached to the back wall 27 of the front seat by means of sockets 8 which are provided with inner and outer threads. These sockets are permanently set into the back wall of the front seat being screwed into nuts imbedded in the back wall as shown in Fig. 1. The inner threads serve to receive the thumb screws 7 which extend out of said openings of hinge members 1. By this manner of fastening the device the metal bars 6, straps 10 and hooks 11 are eliminated entirely.

A pair of channel bars 2, as shown in Fig. 1 and Fig. 4 are secured by pins 12 to hinge members 1. To these channels is attached the table board 13 by means of square head bolts 16. The latter passing through slots 17 in the channels to permit the sliding of the table board rearward, away from the back of the seat, a necessary adjustment in cases of curved seat backs. The table board 13 which may be made of metal, wood or any other suitable material is covered on its upper side with linoleum 14. However any other washable material is suitable. A molding 15 is firmly attached to and around the table board to increase its utility and also to prevent the staining of the upholstery in case anything is spilled. This molding 15 projects above the surface of the board, as shown in Fig. 1 and Fig. 2 to prevent articles placed on the table from sliding off when the vehicle is in motion. The table board is, when in position for use, supported by two props 4 consisting in fact of two turnbuckles 5 to effect adjustment of table to horizontal position. These props are connected at one end to the hinge members 1 by split head bolts 18 and attached at the other to slides 3. These slides are grooved on both sides as shown at 19 in Fig. 3, so as to slide freely in channels 2 from points A to stops 20, Fig. 1, when in open position and back to A when closed. By lifting the table board in position for use the slides 3 move in channels 2 to stop 20. Pins 22 bevelled at the upper ends snap into position at bevelled blocks 21 by the action of coil springs 23. Stops 20 and blocks 21 hold the slides and therewith the props and the table board in rigid position. A pull on knobs 24 returns the table to closed position. The table board 13 connects the bars 6 and the two sets of supports consisting of hinge members 1, channels 2, slides 3 and props 5 to form one complete table unit.

Drawings marked Fig. 1 and Fig. 2 each show one only of the two devices needed for the complete table unit, both being identical in function and construction.

In certain models of automobiles in which the front seat is not rigid, as in so called "coaches", this type of table can advantageously be used by having the table board of a length approximating the width of each individual front seat. Tilting the back of the seat, side swinging the entire seat and/or adjusting it for the operator's comfort does not interfere with the table or its means of attachment.

The invention therefore contemplates the provision of a table board of suitable size and design.

I am aware that prior to my invention automobile tables of various types have been conceived and constructed. I therefore do not claim such a device broadly, but

I claim:

1. In combination a folding table mounted on the back of an automobile seat structure or the like, a pair of hinge members, means securing the hinge members to the seat back, a pair of channel bars mounted on the under side of the table, each channel bar pivoted to the upper end of a hinge member, a slide member mounted in each channel bar and a pair of turn buckles functioning as props, each pivoted to a slide member and the lower end of a hinge member and means to lock the slide member intermediate the ends of the channel bars to hold the table in horizontal position.

2. The combination as in claim 1 in which the means securing the hinge members to the seat back comprises a pair of bars curved and flexible at their upper ends so as to fit over the top of the seat of an automobile or the like, a pair of rectangular loops at the lower ends of said bars and a pair of hooks secured to the lower part of the seat structure, and a pair of adjustable elastic straps connecting the hooks and the loops.

3. The combination as in claim 1 in which the means securing the hinge members to the seat back comprise a pair of bars curved and flexible at their upper ends for hooking over the back of the seat of an automobile or the like, a pair of rectangular loops at the lower ends of said bars, a pair of hooks secured to the lower part of the seat structure, a pair of adjustable elastic straps connecting the hooks and the loops, and said bars having a plurality of spaced threaded openings and said hinge members each provided with thumb screws for engagement with selected ones of said plurality of openings whereby the table can be secured at the desired height.

LEO M. TROENDLE.